US008935452B2

(12) United States Patent
Hsi et al.

(10) Patent No.: US 8,935,452 B2
(45) Date of Patent: Jan. 13, 2015

(54) CONNECTOR ASSEMBLY

(75) Inventors: Mao-Shun Hsi, Tu-Cheng (TW); Yau-Shi Hwang, New Taipei (TW); Chih-Hao Chang, New Taipei (TW); Po-Nien Wang, New Taipei (TW)

(73) Assignee: ScienBiziP Consulting(Shenzhen)Co., Ltd., Guangdong (CN)

( * ) Notice: Subject to any disclaimer, the term of this patent is extended or adjusted under 35 U.S.C. 154(b) by 930 days.

(21) Appl. No.: 13/039,271

(22) Filed: Mar. 2, 2011

(65) Prior Publication Data

US 2012/0058654 A1 Mar. 8, 2012

(30) Foreign Application Priority Data

Sep. 8, 2010 (CN) .......................... 2010 1 0275757

(51) Int. Cl.
*G06F 13/00* (2006.01)
*H01R 11/00* (2006.01)
*H01R 12/72* (2011.01)

(52) U.S. Cl.
CPC .................................... *H01R 12/721* (2013.01)
USPC ............................ 710/303; 710/313; 439/502

(58) Field of Classification Search
CPC ................................ G06F 13/00; H01R 11/00
USPC ......... 710/300, 303, 304, 110, 305, 313–315; 439/502
See application file for complete search history.

(56) References Cited

U.S. PATENT DOCUMENTS

| | | | | |
|---|---|---|---|---|
| 7,423,218 | B2 * | 9/2008 | Konda | 174/74 R |
| 7,609,255 | B2 * | 10/2009 | Frederick et al. | 345/211 |
| 8,276,005 | B2 * | 9/2012 | Bae et al. | 713/300 |
| 2007/0212927 | A1 * | 9/2007 | Krohn et al. | 439/489 |
| 2008/0250184 | A1 * | 10/2008 | Sheafor et al. | 710/306 |
| 2009/0083825 | A1 * | 3/2009 | Miller et al. | 725/151 |
| 2010/0135429 | A1 * | 6/2010 | Nakajima | 375/295 |
| 2010/0244765 | A1 * | 9/2010 | Collopy et al. | 320/103 |
| 2010/0295384 | A1 * | 11/2010 | Kobayashi | 307/154 |
| 2011/0068736 | A1 * | 3/2011 | Chartier et al. | 320/107 |
| 2011/0084685 | A1 * | 4/2011 | Zhong et al. | 324/76.11 |
| 2011/0125930 | A1 * | 5/2011 | Tantos et al. | 710/8 |
| 2012/0080954 | A1 * | 4/2012 | Gachon et al. | 307/80 |

OTHER PUBLICATIONS

Definition of HDMI,<http://en.wikipedia.org/wiki/HDMI>, last accessed May 2, 2014.*

* cited by examiner

*Primary Examiner* — Khanh Dang
(74) *Attorney, Agent, or Firm* — Novak Druce Connolly Bove + Quigg LLP

(57) ABSTRACT

A connector assembly for connecting a peripheral device to a computer includes a male connector having a plurality of first connecting pins and a female connector having a plurality of second connecting pins. The plurality of first connecting pins is configured to connect to the peripheral device. The plurality of second connecting pins is configured to connect to the computer. The plurality of second connecting pins is defined on the first circuit board in a second row and a third row. The plurality of second connecting pins comprises a plurality of differential pairs, and each differential pair comprises two differential transmission lines. The two differential transmission lines of each of the plurality of differential pairs are defined on a single row of the second and third rows.

15 Claims, 4 Drawing Sheets

CONNECTOR ASSEMBLY

BACKGROUND

1. Technical Field

The disclosure generally relates to connector technology, and especially to a connector assembly for different peripheral devices.

2. Description of Related Art

Docking connectors are used to enable portable computers to cooperate with peripheral devices such as printers, scanners, monitors, and others. A docking connector usually includes a male connector connecting to a desktop computer peripheral device and a female connector connecting to the portable computer is often employed. Such connectors can use differential transmission lines in layout of the connecting pins. However, some of the docking connectors cannot use differential transmission lines in layout due to specialized structure of the connecting pins.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
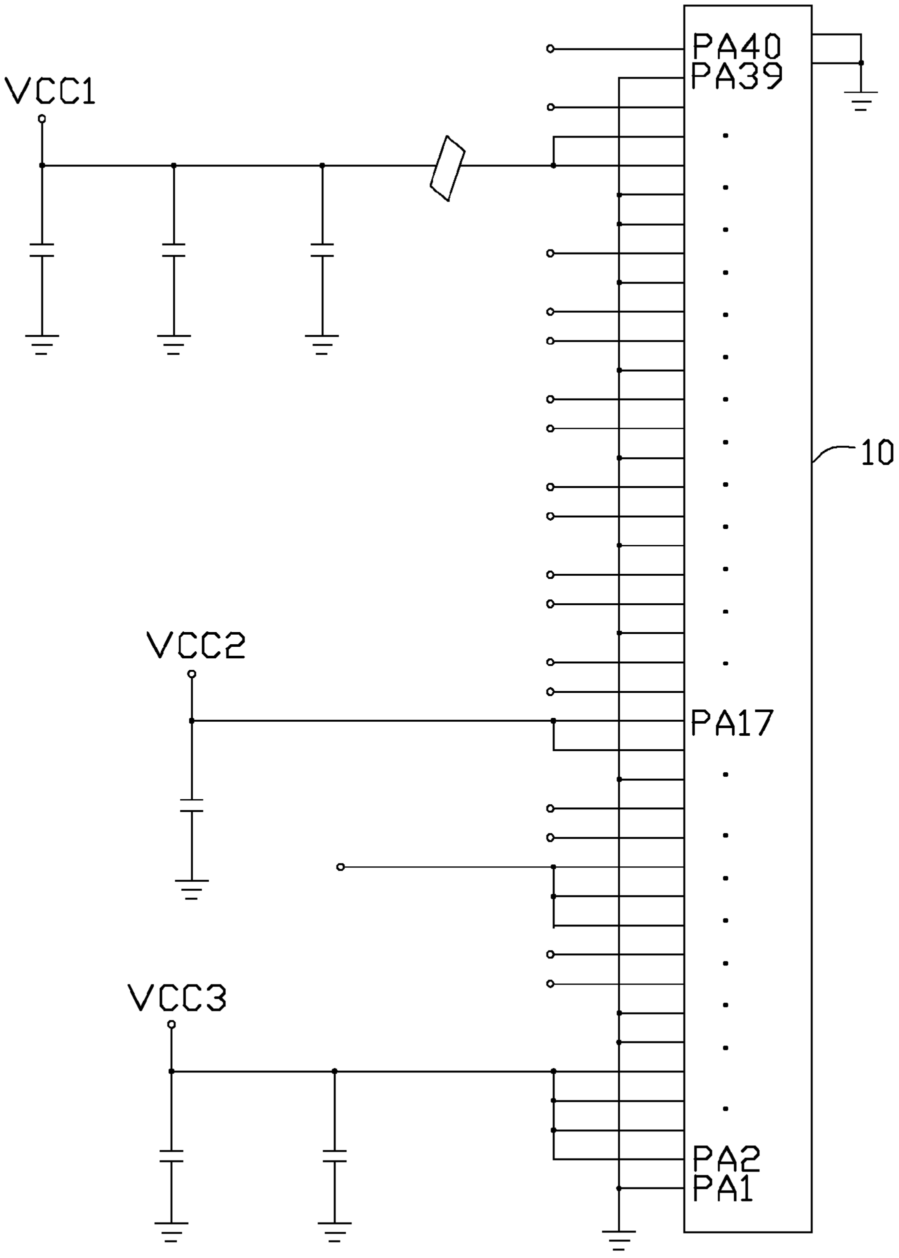
FIG. 1 is a circuit view of an embodiment of a male connector of a connector assembly.
Figure 2:
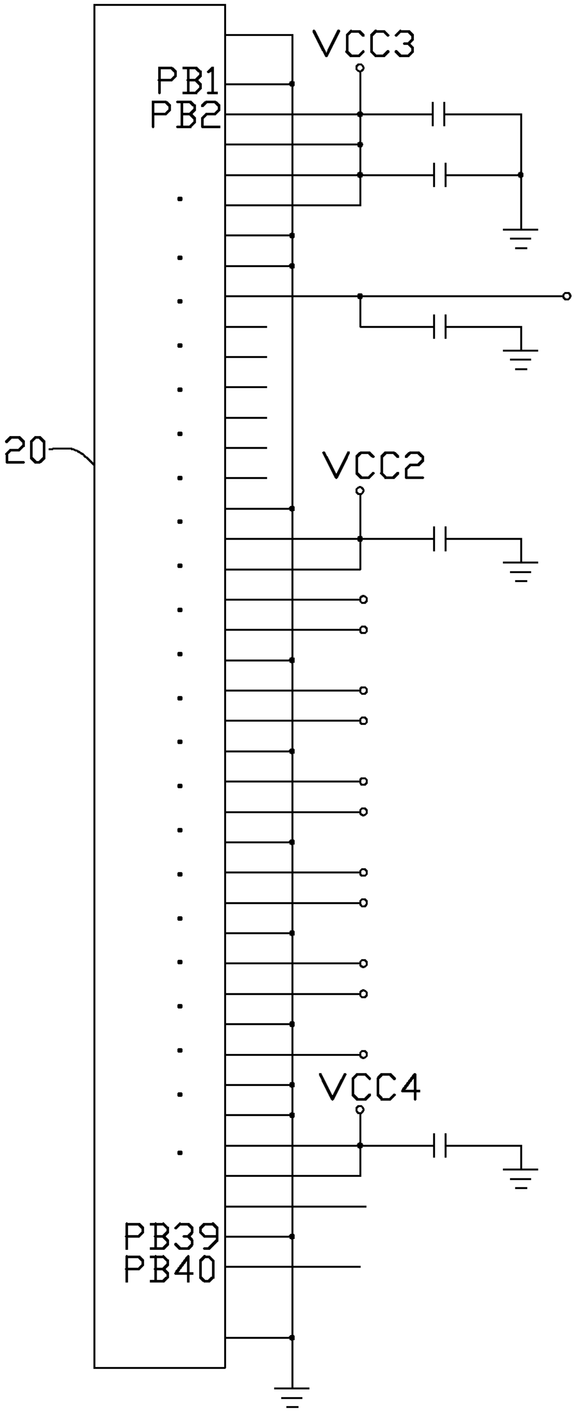
FIG. 2 is a circuit view of an embodiment of a female connector of the connector assembly.

Referring to FIG. 1, an embodiment of a connector assembly for connecting a peripheral device (not shown) to a computer (not shown) includes a male connector 10 and a female connector 20. The male connector 10 includes a plurality of connecting pins PA1~PA40 for connecting to the peripheral device. The female connector 20 includes a plurality of connecting pins PB1~PB40 for connecting to the computer.

The plurality of connecting pins PA1~PA40 includes five differential pairs, each including two differential transmission lines. The connecting pins PA40 and PA38 are differential transmission lines and constitute a first differential pair. The connecting pins PA33 and PA31 are differential transmission lines and constitute a second differential pair. The connecting pins PA30 and PA28 are differential transmission lines and constitute a third differential pair. The connecting pins PA27 and PA25 are differential transmission lines and constitute a fourth differential pair. The connecting pins PA24 and PA22 are differential transmission lines and constitute a fifth differential pair. The connecting pins PA39, PA32, PA29, PA26 and PA23 are ground terminals. The connecting pin PA21 is High Definition Multimedia Interface Display Data Channel Serial Clock (HDMI_DDC_SCL) terminal. The connecting pin PA18 is High Definition Multimedia Interface Display Data Channel Serial Data (HDMI_DDC_SDA) terminal. The connecting pins PA21 and PA18 are configured to receive serial display clock signals and serial display data signals from the female connector 20 respectively. The connecting pin PA19 is High Definition Multimedia Interface Hot-Plugging Detection (HDMI_HPD) terminal. The connecting pin PA19 is configured to receive Hot-Plugging signals from the female connector 20. The connecting pin PA14 is Battery Serial Data (BATB_SDA) terminal. The connecting pin PA13 is Battery Serial Clock (BATB_SCL) terminal. The connecting pins PA14 and PA13 are configured to receive battery serial data signals and battery serial clock signals from the female connector 20 respectively. The connecting pin PA9 is battery detection terminal. The connecting pin PA8 is DC voltage transmission terminal. The connecting pins PA9 and PA8 are configured to transmit battery detection signals and DC voltage signals to the female connector 20 respectively.

The plurality of connecting pins PB1~PB40 includes five differential pairs each including two differential transmission lines. The connecting pins PB40 and PB38 are differential transmission lines and constitute a first differential pair. The connecting pins PB33 and PB31 are differential transmission lines and constitute a second differential pair. The connecting pins PB30 and PB28 are differential transmission lines and constitute a third differential pair. The connecting pins PB27 and PB25 are differential transmission lines and constitute a fourth differential pair. The connecting pins PB24 and PB22 are differential transmission lines and constitute a fifth differential pair. The connecting pins PB39, PB32, PB29, PB26 and PB23 are ground terminals. The connecting pin PB21 is Inter-Integrated Circuit Display Data Channel Serial Clock (I2C_DDC_SCL) terminal. The connecting pin PB18 is Inter-Integrated Circuit Display Data Channel Serial Data (I2C_DDC_SDA) terminal. The connecting pins PB21 and PB18 are configured to transmit serial display clock signals and serial display data signals respectively. The connecting pin PB19 is High Definition Multimedia Interface Hot-Plugging Detection (HDMI_HPD) terminal. The connecting pin PA19 is configured to transmit Hot-Plugging signals. The connecting pin PB8 is DC voltage receiving terminal. The connecting pin PB8 is configured to receive DC voltage signals from the male connector 10.

Figure 3:
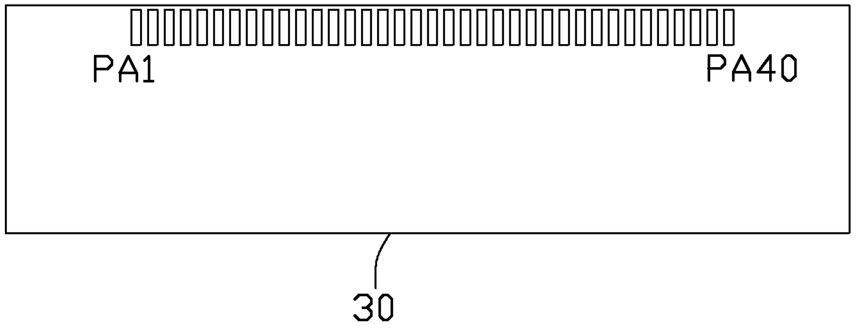
FIG. 3 is an isometric view of connecting pins of the male connector aligned on a circuit board.
Figure 4:
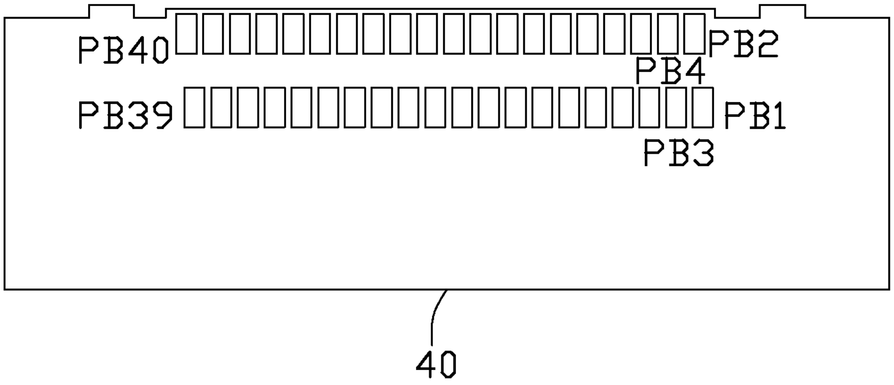
FIG. 4 is an isometric view of connecting pins of the female connector aligned on a circuit board.

Referring to FIGS. 3 to 4, the plurality of connecting pins PA1~PA40 is defined on a first circuit board 30 in a first row. The plurality of connecting pins PB1~PB40 is defined on a second circuit board 40 in a second row and a third row. The two differential transmission lines of each differential pair are defined on a single row of the second and third rows. In one embodiment, the connecting pins of even numbers in the plurality of connecting pins PB1~PB40 are defined on the second row. The connecting pins of odd numbers in the plurality of connecting pins PB1~PB40 are defined on the third row. The connector assembly is not limited to define the plurality of connecting pins PB1~PB40 on the circuit board 40 in the second and third rows. The plurality of connecting pins PB1~PB40 can also be defined on the circuit board 40 in several rows to make sure the two differential transmission lines of each differential pair are defined on a single row of the several rows. The connector assembly achieves differential layout of the plurality of connecting pins PB1~PB40 on the circuit board 40, which decreases crosstalk between the different signals.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A connector assembly for connecting a peripheral device to a computer, comprising:

a male connector comprising a plurality of first connecting pins configured to connect to the peripheral device; and a female connector comprising a plurality of second connecting pins defined on a first circuit board configured to connect to the computer, wherein the plurality of second connecting pins are defined on the first circuit board in a second row and a third row; the plurality of second connecting pins comprises a plurality of differential pairs, and each differential pair comprising two differential transmission lines; and the two differential transmission lines of each differential pair are defined on a single row of the second and third rows;

wherein the plurality of first connecting pins comprises a Battery Serial Data (BATB_SDA) terminal configured to receive battery serial data signals, and a Battery Serial Clock (BATB_SCL) terminal configured to receive battery serial clock signals from the female connector.

2. The connector assembly of claim 1, wherein a ground terminal is defined on the first circuit board between each of the two adjacent differential pairs.

3. The connector assembly of claim 2, wherein the plurality of first connecting pins is defined on second circuit board in a first row.

4. The connector assembly of claim 3, wherein the plurality of first connecting pins comprises a High Definition Multimedia Interface Display Data Channel Serial Clock (HDMI_DDC_SCL) terminal configured to receive serial display clock signals, and a High Definition Multimedia Interface Display Data Channel Serial Data (HDMI_DDC_SDA) terminal configured to receive serial display data signals from the female connector.

5. The connector assembly of claim 4, wherein the plurality of second connecting pins comprises an Inter-Integrated Circuit Display Data Channel Serial Clock (I2C_DDC_SCL) terminal configured to transmit the serial display clock signals, and an Inter-Integrated Circuit Display Data Channel Serial Data (I2C_DDC_SDA) terminal configured to transmit the serial display data signals.

6. The connector assembly of claim 1, wherein the plurality of first connecting pins further comprising a first High Definition Multimedia Interface Hot-Plugging Detection (HDMI_HPD) terminal configured to receive Hot-Plugging signals from the female connector.

7. The connector assembly of claim 6, wherein the plurality of first connecting pins further comprising a battery detection terminal configured to transmit battery detection signals, and a DC voltage transmission terminal configured to transmit DC voltage signals to the female connector.

8. The connector assembly of claim 6, wherein the plurality of second connecting pins further comprising a second HDMI_HPD terminal configured to transmit the Hot-Plugging signals.

9. The connector assembly of claim 7, wherein the plurality of second connecting pins further comprising a DC voltage receiving terminal configured to receive the DC voltage signals from the male connector.

10. A connector assembly comprising:

a female connector comprising a plurality of second connecting pins defined on a first circuit board, wherein the plurality of second connecting pins are defined on the first circuit board in a second row and a third row; the plurality of second connecting pins comprises a plurality of differential pairs, and each differential pair comprising two differential transmission lines; and the two differential transmission lines of each of the plurality of differential pairs are defined on a single row of the second and third rows; and a male connector having a plurality of first connecting pins configured to connect to a peripheral device; and the plurality of second connecting pins are configured to connect to a computer;

wherein the plurality of second connecting pins further comprising a second High Definition Multimedia Interface Hot-Plugging Detection (HDMI_HPD) terminal configured to transmit Hot-Plugging signals; the plurality of first connecting pins are defined on second circuit board in a first row; the plurality of first connecting pins comprises a High Definition Multimedia Interface Display Data Channel Serial Clock (HDMI_DDC_SCL) terminal configured to receive serial display clock signals, and a High Definition Multimedia Interface Display Data Channel Serial Data (HDMI_DDC_SDA) terminal configured to receive serial display data signals from the female connector; the plurality of second connecting pins comprises an Inter-Integrated Circuit Display Data Channel Serial Clock (I2C_DDC_SCL) terminal configured to transmit the serial display clock signals, and an Inter-Integrated Circuit Display Data Channel Serial Data (I2C_DDC_SDA) terminal configured to transmit the serial display data signals.

11. The connector of claim 10, wherein a ground terminal is defined on the first circuit board between each of the two adjacent differential pairs.

12. The connector of claim 10, wherein the plurality of first connecting pins further comprising a Battery Serial Data (BATB_SDA) terminal configured to receive battery serial data signals, and a Battery Serial Clock (BATB_SCL) terminal configured to receive battery serial clock signals from the female connector.

13. The connector of claim 12, wherein the plurality of first connecting pins further comprising a first High Definition Multimedia Interface Hot-Plugging Detection (HDMI_HPD) terminal configured to receive the Hot-Plugging signals from the female connector.

14. The connector of claim 13, wherein the plurality of first connecting pins further comprising a battery detection terminal configured to transmit battery detection signals, and a DC voltage transmission terminal configured to transmit DC voltage signals to the female connector.

15. A connector assembly for connecting a peripheral device to a computer, comprising:

a male connector comprising a plurality of first connecting pins configured to connect to the peripheral device; and a female connector comprising a plurality of second connecting pins defined on a first circuit board configured to connect to the computer, wherein the plurality of second connecting pins are defined on the first circuit board in a second row and a third row; the plurality of second connecting pins comprises a plurality of differential pairs, and each differential pair comprising two differential transmission lines; and the two differential transmission lines of each differential pair are defined on a single row of the second and third rows;

wherein the plurality of first connecting pins further comprising a battery detection terminal configured to transmit battery detection signals, and a DC voltage transmission terminal configured to transmit DC voltage signals to the female connector.

* * * * *